United States Patent Office 3,289,736
Patented Dec. 6, 1966

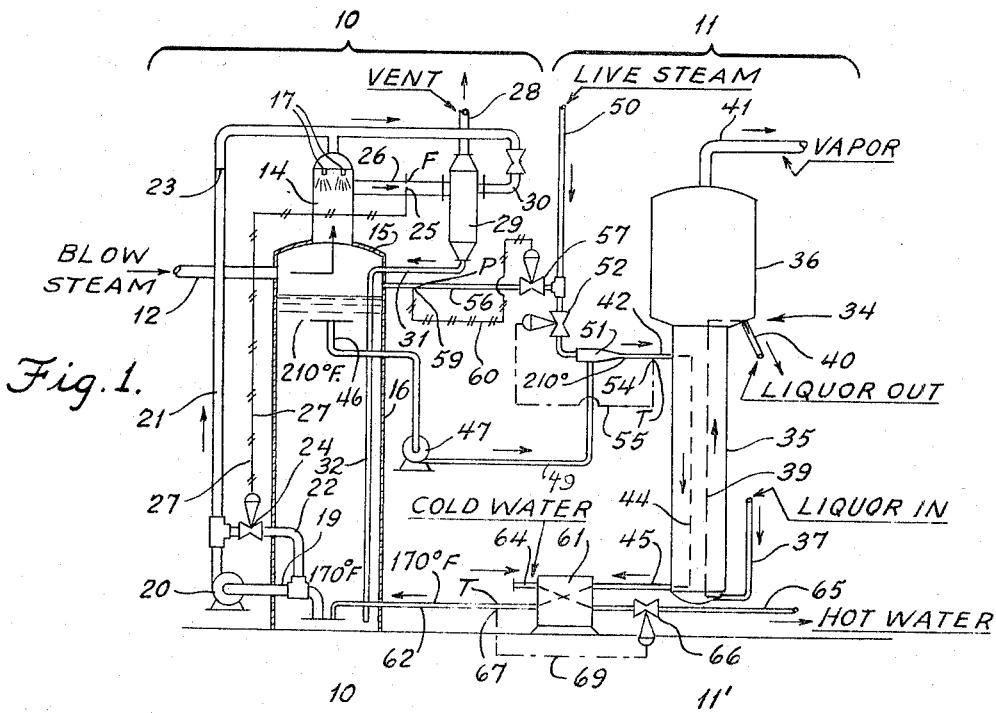
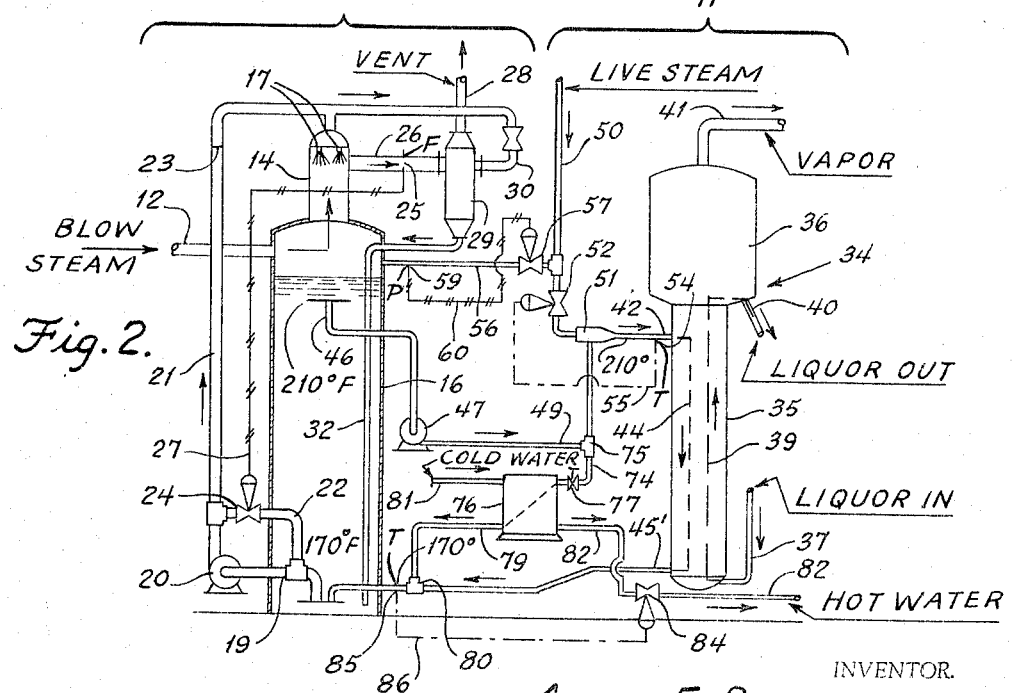

3,289,736
TEMPERATURE CONTROL FOR EVAPORATION SYSTEM
Axel E. Rosenblad, % Rosenblad Corp., P.O. Box 585, Princeton, N.J.
Filed June 30, 1964, Ser. No. 379,280
14 Claims. (Cl. 159—24)

This invention relates to an evaporation system and method, and more particularly relates to a novel temperature control apparatus and method for such system.

The system and method of the present invention may be employed to advantage in connection with a number of processes wherein vapors containing appreciable heat are discharged at one or more stages of the process. In the illustrative embodiments of the system shown in the drawings and described herein, such system is employed in reclaiming available heat in vapors such as "flashed vapors." The present invention is here disclosed by way of example in connection with its use in the reduction of wood chips to pulp in the manufacture of paper. It is to be understood, however, that the invention is not limited to the paper-making field, and that it may be used to advantage in a number of other processes.

In the manufacture of wood pulp by a conventional process, wood chips are introduced into a pressure vessel to which an aqueous chemical solution is added. The vessel is then sealed and heat is applied thereto as by introducing steam under pressure into the vessel. Alternatively, the vessel may be heated indirectly by means of heat exchange from a heating fluid such as steam. After a desired period of time, the aqueous solution will have reduced the wood chips to a pulp, the reaction then being completed.

Following this, the discharge valve of the vessel is opened, thereby releasing the pulp and residual aqueous solution which are thus "blown" under pressure from the vessel to a receiver such as a tank. Upon such release of pressure from the vessel and the discharge of its contents to the receiver, substantial quantities of heated vapors are released. In such system the heated vapors are condensed, the thus formed condensate being collected in an accumulator tank of such construction that the condensate in the tank at one zone thereof is relatively hot and the condensate in the tank at another zone thereof is relatively cool. The condensate in the accumulator tank is employed as the source of heat for an evaporator of the indirect or heated surface type, the condensate flowing from the first, hot zone of the accumulator tank to the evaporator and after traveling through the heating channel or channels of the evaporator being returned to the second cooler zone of the accumulator tank.

The present invention relates to a novel temperature control apparatus and method for a blowheat evaporation system of the type above indicated. In such system it is important to keep the temperature of the hot condensate flowing from the first zone of the accumulator tank to the inlet port of the evaporator at a constant high value. It is also important to keep the temperature of the then cooled liquid flowing from the outlet port of the evaporator and to the second cooler zone of the accumulator tank at a constant low level. If the temperature of the hot condensate drops substantially, which can happen if the subsequent blow has been delayed and the level of the cooled condensate has approached the top of the accumulator tank, the capacity of the evaporator which is heated by such condensate drops immediately.

In order to overcome the above-outlined difficulties with prior blowheat evaporation systems, in accordance with the present invention there is provided a controllable means for adding heat to the hot condensate prior to its entry into the evaporator. Such controllable means is preferably made responsive to a means which is sensitive to the temperature of the hot condensate entering the evaporator. The heat thus added to the hot condensate will ordinarily represent only a small percentage of the total b.t.u./hour required for the operation of the evaporator. Such added heat can usually be recovered as by heating process-water or for other purposes, and so it actually does not represent much, if any, loss.

To control the temperature of the cooled condensate employed as the heating medium for the evaporator and discharged from the outlet port thereof in accordance with the present invention, there is provided a further heat exchanger in which such cooled condensate flows in heat exchanging relationship with a cooling fluid such as cold water. There is also preferably provided means for controlling the rate of flow of such cooling fluid, such controlling means being governed by a means which is responsive to the temperature of the cooled condensate flowing into the second, cooler zone of the accumulator tank. With such system it is thus possible to deliver the cooled condensate to the cooler zone of the accumulator tank at a substantially fixed temperature.

The invention has among its objects the provision of novel temperature control apparatus for a blowheat evaporation system, and the provision of a novel method of controlling the temperature of the heated condensate which is employed as the heating medium for the evaporator of such system.

A further object of the invention, in a preferred embodiment thereof, resides in an improved apparatus wherein the temperature of the hot condensate entering the evaporator is held at a substantially fixed high value by the addition of heat thereto prior to its entry into the evaporator.

Another object of the invention is the provision in a blowheat evaporation system of mechanism for reducing the temperature of the condensate discharged from the evaporator to a substantially fixed low temperature prior to the return of such condensate to a low temperature zone of the accumulator tank.

Yet another object of the invention lies in the provision, in a blowheat evaporation system of the type described, of mechanism for introducing vapor under pressure into the top of the accumulator tank, whereby to avoid the intake of air into the system between blows.

A further object of the invention is the provision of a novel method of controlling the temperature of condensate employed as a source of heat for a blowheat evaporation system.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a somewhat diagrammatic view of a blowheat evaporation system in accordance with the invention, such system incorporating a first embodiment of appaartus for controlling the temperature of the condensate employed as the heating medium for the evaporator of such system; and FIG. 2 is a somewhat diagrammatic view of a blowheat evaporation system similar to that of FIG. 1, the system of FIG. 2 incorporating a second embodiment of temperature control apparatus for the condensate employed as the heating medium for the evaporator.

Turning now to FIG. 1, there is shown therein a blowheat evaporation system having a first portion 10 which may be generally termed a blowheat accumulator and a second portion 11 connected to and heated by portion 10, portion 11 being generally termed a blowheat evaporator. Portion 10 includes an inlet conduit 12 for receiving the vapors from a periodically discharged heated vessel such as a pulp digester. Such vapors, here designated "blow steam," are led upwardly into a primary condenser 14 of the direct type which is shown affixed to the top or hood portion 15 of a hot water accumulator tank 16. As shown, normally the upper end 15 of tank 16 contains only vapors, such vapors progressing from conduit 12, upwardly from the upper end of the accumulator, and through the primary condenser 14 where they are subjected to cooling liquid which is directed downwardly in the form of showers from the spray nozzles 17. The embodiment of blowheat evaporation systems shown incorporates therein mechanism for controlling the flow of cooling fluid to the condenser 14 which is the subject of the prior application Serial No. 374,208, filed June 10, 1964, now abandoned, of the present inventor. Such mechanism includes a supply conduit 19 which extends into tank 16 in communication with the cool zone of the condensate therein adjacent the bottom of the accumulator tank. Cool condensate is fed from the tank through pipe 19 to a constantly driven pump 20 and thence through a delivery conduit 21 to the shower or spray nozzles 17, as shown. A further conduit 22 is connected in shunt with pump 20 and between the conduits 19 and 21. Interposed in conduit 22 is a flow control valve 24 which is under the control of a means 25 disposed in or at a discharge conduit 26 leading from condenser 14. In the embodiment shown, device 25 incorporates an orifice and means which senses the flow of uncondensable vapors from blow steam flowing through such orifice and thus the conduit 26. Means 25 is operatively connected to the controllable valve 24 by a suitable connecting circuit shown shown schematically at 27.

During operation of the system, when no blow steam is introduced into conduit 12, the pump 20 is driven and valve 24 is opened sufficiently to maintain a column of condensate in conduit 21 with its upper end disposed, for example, at the level shown at 23. When blow steam enters condenser 14 and is detected by means 25, valve 24 is closed sufficiently for the condensate in conduit 22 to be thrust upwardly to feed spray heads 17 and the further conduit 30 which leads to an after condenser 29. Cooling liquid is returned from condenser 29 through pipe 31 and thence to the lower cool zone in accumulator tank 16 through the pipe 32. Uncondensed vapors which pass through the after condenser 29 issue therefrom through a stack 28.

The portion 11 of the system shown includes an evaporator generally designated 34 which may be of the indirect or heated plate type. Such evaporator has a lower portion 35 which may include a plurality of vertically disposed plates (not shown) connected and sealed together so as to present a first series of parallel connected channels designated schematically by the reference character 39 and a second plurality of parallel connected channels, generally designated 44, which are isolated from the channels 39 but are in heat exchanging relationship therewith. The channels or path 39 are fed at their lower end by a conduit 37 through which process liquor is introduced into the evaporator. At their upper ends the channels constituting path 39 are open to a vapor hood 36, the lower end of such hood discharging concentrated process liquor through a conduit 40. Vapors from the liquor, collected in hood 36, are discharged through a conduit 41 connected to the top of the hood.

The channels constituting the heating path 44 are connected at their upper ends to an inlet port in portion 35 of the evaporator, a liquid delivery pipe 42 being connected to such inlet port. The channels constituting path 44 are connected at their lower ends to an outlet port in portion 35 of the evaporator, a condensate delivery pipe 45 being connected to such outlet port. Hot condensate from accumulator tank 16 is drawn therefrom by pipe 46 communicating with the upper, hotter zone of such condensate. Hot condensate delivered through pipe 46 is fed by gravity to a pump 47 which forwards it under pressure through a pipe 49 which connects with the aforesaid inlet pipe 42.

In accordance with the present invention there is provided a means 51 which, in the embodiment shown, is in the form of an injector whereby live steam supplied from a suitable source (not shown) through a pipe 50 is injected into the hot condensate flowing into the pipe 42. The flow of steam through pipe 50 and into the injector 51 is under the control of a variable throttling valve 52 which is interposed in pipe 50. Valve 52, which may be of conventional construction, is controlled by a temperature sensitive element 54 such as a thermocouple which may be inserted into or affixed to pipe 42, element 54 being connected to valve 52 by a suitable control linkage or line 55. The temperature sensitive element 54, the valve 52, and the control line 55 are so constructed and arranged as to maintain the temperature of the hot condensate flowing through pipe 42 at a constant high level at all times, for example 210° F., regardless of whether or not blow steam enters the system at any particular moment.

The system shown also preferably includes means whereby the space within the upper end portion 15 of the accumulator tank 16 above the top of the condensate therein is maintained at all times filled with vapor at a predetermined desired pressure. This prevents the intake of air into such space during those times when blow steam is not being introduced into the conduit 12. Such means includes a branch pipe 56 which is connected to pipe 50 in advance of valve 52 and communicates with the upper space in tank 16 within portion 15 thereof. Interposed in pipe 56 is a pressure control valve 57 which is under the control of a pressure sensitive means 59 which communicates with the interior of pipe 56 outwardly of the accumulator tank. A control circuit or line schematically shown at 60 connects means 59 with the controlling mechanism of valve 57. Means 59 which may be adjustable will thus function to cause valve 57 to admit sufficient steam from pipe 50 into the space above the condensate in the accumulator tank to maintain it under the desired vapor pressure.

The temperature of cooled condensate issuing from path 44 in the evaporator is also preferably controlled so that it is at a predetermined low temperature when it is re-introduced into the accumulator tank 16. For this purpose there is provided a further heat exchanger 61 having two separated but heat exchanging channel sets or paths therein, such paths being shown by dash lines in the drawing. The discharge pipe 45 communicates with the inlet port of one of said paths, the outlet port of such path being connected by a pipe 62 to the bottom cooler zone of the accumulator tank 16. A source of cold water is connected by a pipe 64 to the inlet port of the other of said paths through the heat exchanger 61, a hot water delivery pipe 65 being connected to the outlet port of such latter path. Interposed in either of pipes 64 or 65, and here shown in pipe 65, is a temperature controlled flow controlling valve 66 which is under the control of a temperature sensitive element 67 which is disposed to sense the temperature of the condensate flowing through pipe 62. Element 67 is connected to valve 66 by a control line or circuit 69.

It will be apparent that with a suitable choice of components and adjustments of the same the temperature of condensate flowing through pipe 62 may be held at a predetermined lower temperature, for example 170° F. Thus when the temperature of such condensate rises slightly above such value, valve 66 is opened to introduce more cooling water through the pipe 64 and the heat exchanger 61. When the temperature of condensate in pipe 62 decreases, the flow of cooling water into pipe 64 is correspondingly decreasesd.

The embodiment of evaporation system illustrated in FIG. 2 is the same as that of FIG. 1 in the blowheat accumulator portion 10 thereof. Accordingly, such portion of the system and the components thereof in FIG. 2 are designated by the same reference characters as in FIG. 1. The blowheat evaporator portion of the system of FIG. 2 differs from that of FIG. 1 in the portion thereof relating to the treatment of the discharged heating liquid issuing from the evaporator 34. Accordingly, parts of the blowheat evaporator portion of the system in FIG. 1, here designated 11′, which are the same as those of portion 11 of FIG. 1, are designated by the same reference characters as in FIG. 1. Components of portion 11′ which differ from those of portion 11 of FIG. 1 are designated either by the same reference characters with added primes or by different reference characters.

In the evaporator portion 11′ of FIG. 2 the pipe 49 conducting hot condensate to the inlet port of the evaporator 34 is provided with a branch pipe 74, which is connected to pipe 49 as by a T fitting 75. Hot condensate fed by pipe 74 is introduced into a heat exchanger 76 through a throttling valve 77. Such hot condensate flows through the heat exchanger 76, being discharged therefrom through a pipe 79 which is connected to the discharge pipe 45′ from the evaporator 34 at a T fitting 80. Cold water is introduced into the heat exchanger 76 through a pipe 81, such cold water flowing through the heat exchanger in a path separated from that for the hot condensate but in heat exchanging relationship therewith. The then heated cold water flows from the heat exchanger 76 through a discharge pipe 82 in which there is interposed a temperature controlled valve 84. Valve 84 is under the control of a temperature responsive element 85 which is associated with pipe 45′ downstream of its point of connection 80 with pipe 79. A suitable control circuit schematically shown at 86 connects element 85 with the controlling means of valve 84.

It will be apparent that with a suitable adjustment of the temperature responsive element 85 and of the throttling valve 77, the temperature of the liquid which flows through pipe 45′ and into the bottom of the accumulator tank 16 may be controlled to be maintained at a suitable low level regardless of the variations in temperature of the hot condensate flowing through the pipe 49. The throttling valve 77 may be replaced, if desired, by means providing a suitable orifice having a fixed effective area of passage therethrough.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus, for example, instead of employing steam injected into the hot condensate as a source of added heat there may be substituted for the steam injector a heat exchanger whereby a hot fluid imparts heat to the hot condensate flowing into the evaporator.

What is claimed is:

1. A system having a condenser fed intermittently with flashed vapors, an accumulator tank receiving condensate from said vapors issuing from the condenser, said accumulator tank being of such character as to hold the condensate therein with the condensate at a marked temperature differential between the condensate at a different first and second spaced zones therein, a heated surface type evaporator having an inlet port, a first conduit means connected between said inlet port and the accumulator tank to receive liquid functioning as a source of heat for the evaporator from a hot zone of the accumulator tank, said evaporator having an outlet port, a second conduit means connected between said outlet port and the accumulator tank to discharge such liquid to another, markedly cooler zone of the accumulator tank, means for introducing a process liquor into the evaporator in heat exchanging relationship with said heating liquid in the evaporator, and means disposed in advance of said inlet port for adding heat to the hot liquid fed to the evaporator and functioning as a source of heat therefor so as to maintain the temperature of such hot liquid at a desired high level.

2. A system as claimed in claim 1, wherein the means for adding heat to said hot liquid is disposed between said hot zone of the accumulator tank and said inlet port of the evaporator.

3. A system as claimed in claim 1, wherein the means for adding heat to said hot liquid is interposed in said first conduit means and comprises means adapted to feed a heated fluid into said first conduit means to mix with the liquid delivered from the hot zone of the accumulator tank.

4. A system as claimed in claim 3, wherein the means for adding heat to said hot liquid is an injector in said first conduit means, and the heated fluid fed to the injector is steam.

5. A system as claimed in claim 1, comprising control means for the means for adding heat to said hot liquid, and means responsive to the temperature of the hot liquid fed to the inlet port of the evaporator connected to said control means to maintain the temperature of the hot liquid fed to the evaporator at a desired value.

6. A system as claimed in claim 1, wherein the accumulator tank is closed and has a space above the liquid therein, and means for maintaining said upper space in the accumulator tank filled with vapor under a predetermined desired pressure.

7. A system as claimed in claim 6, wherein the means for maintaining the upper space in the accumulator tank filled with vapor under pressure comprises a conduit connected to a source of steam under pressure and to the accumulator tank to communicate with the upper space within said tank, a controllable throttling valve interposed in said conduit, and means responsive to pressure within said space within the accumulator tank for controlling said valve.

8. A system having a condenser fed intermittently with flashed vapors, an accumulator tank receiving condensate from said vapors issuing from the condenser, said accumulator tank being of such character as to hold the condensate therein with the condensate at a marked temperature differential between the condensate at different first and second spaced zones therein, a heated surface type evaporator having an inlet port, a first conduit means connected between said inlet port and the accumulator tank to receive liquid functioning as a source of heat for the evaporator from a hot zone of the accumulator tank, said evaporator having an outlet port, a second conduit means connected between said outlet port and the accumulator tank to discharge such liquid, means for introducing a process liquor into the evaporator in heat exchanging relationship with said heating liquid in the evaporator, said conduit means connecting the outlet port of the evaporator to discharge cooled heating liquid therefrom to a markedly cooler zone of the accumulator tank, an indirect heat exchanger interposed in said conduit, and means for introducing a cooling fluid into heat exchanging relationship with the discharged heating liquid flowing through the heat exchanger so as to maintain the temperature of such discharged heating liquid at a desired low level.

9. A system as claimed in claim 8, comprising means responsive to the temperature of the discharged heating liquid flowing from the heat exchanger toward the cool zone of the accumulator tank, and means controlled by the last named means for controlling the flow of cooling fluid to the heat exchanger.

10. A system as claimed in claim 9, wherein the cooling fluid is cool water, the heat exchanger has heat exchanging means maintaining the cooling water separate from but in heat exchanging relationship with the discharged heating liquid, and a discharge conduit connected to the heat exchanger to deliver the now heated cooling water therefrom.

11. A system having a condenser fed intermittently with flashed vapors, an accumulator tank receiving condensate from said vapors issuing from the condenser, said accumulator tank being of such character as to hold the condensate therein with the condensate at a marked temperature differential between the condensate at different first and second spaced zones therein, a heated surface type evaporator having an inlet port connected to receive liquid functioning as a source of heat for the evaporator from a hot zone of the accumulator tank and an outlet port to discharge such liquid, means for introducing a process liquor into the evaporator in heat exchanging relationship with said heating liquid in the evaporator, means disposed in advance of said inlet port for adding heat to the hot liquid fed to the evaporator and functioning as a source of heat therefor so as to maintain the temperature of such hot liquid at a desired high level, an indirect heat exchanger, a conduit connecting the outlet port of the evaporator to discharge cooled heating liquid from the evaporator via the heat exchanger to a markedly cooler zone of the accumulator tank, and means for introducing a cooling fluid into the heat exchanger in heat exchanging relationship with the discharged heating liquid flowing through the heat exchanger so as to maintain the temperature of such discharged heating liquid at a desired low level.

12. A method of reclaiming heat in a system having a condenser fed intermittently with flashed vapors, an accumulator tank receiving condensate from said vapors issuing from the condenser, said accumulator tank being of such character as to hold the condensate therein with the condensate at a marked temperature differential between the condensate at different first and second spaced zones therein, a heated surface type evaporator having an inlet port connected to receive liquid functioning as a source of heat for the evaporator from a hot zone of the accumulator tank and an outlet port to discharge such liquid to another, markedly cooler zone of the accumulator tank, and means for introducing a process liquor into the evaporator in heat exchanging relationship with said heating liquid in the evaporator, said method comprising adding heat to the hot liquid fed to the evaporator and functioning as a source of heat therefor at a location between the accumulator tank and the evaporator so as to maintain the temperature of such hot liquid at a desired high level.

13. A method of reclaiming heat in a system having a condenser fed intermittently with flashed vapors, an accumulator tank receiving condensate from said vapors issuing from the condenser, said accumulator tank being of such character as to hold the condensate therein with the condensate at a marked temperature differential between the condensate at different first and second spaced zones therein, a heated surface type evaporator having an inlet port connected to receive liquid functioning as a source of heat for the evaporator from a hot zone of the accumulator tank and an outlet port to discharge such liquid, means for introducing a process liquor into the evaporator in heat exchanging relationship with said heating liquid in the evaporator, a conduit connecting the outlet port of the evaporator to discharge heating liquid therefrom to a markedly cooler zone of the accumulator tank, said method comprising passing a cooling fluid into heat exchanging relationship with the discharged heating liquid flowing through said conduit so as to maintain the temperature of such discharged heating liquid at a desired low level.

14. A method of reclaiming heat in a system having a condenser fed intermittently with flashed vapors, an accumulator tank receiving condensate from said vapors issuing from the condenser, said accumulator tank being of such character as to hold the condensate therein with the condensate at a marked temperature differential between the condensate at different first and second spaced zones therein, a heated surface type evaporator having an inlet port connected to receive liquid functioning as a source of heat for the evaporator from a hot zone of the accumulator tank and an outlet port to discharge such liquid, means for introducing a process liquor into the evaporator in heat exchanging relationship with said heating liquid in the evaporator, a conduit connecting the outlet port of the evaporator to discharge heating liquid therefrom to a markedly cooler zone of the accumulator tank, said method comprising adding heat to the hot liquid fed to the evaporator and functioning as a source of heat therefor at a location between the accumulator tank and the evaporator so as to maintain the temperature of such hot liquid at a desired high level, and passing a cooling fluid into heat exchanging relationship with the discharged heating liquid flowing through said conduit so as to maintain the temperature of such discharged heating liquid at a desired low level.

References Cited by the Examiner

UNITED STATES PATENTS

| | | | |
|---|---|---|---|
| 2,711,992 | 6/1955 | Kerner | 202—160 |
| 2,769,773 | 11/1956 | Burns | 202—160 X |
| 2,770,295 | 11/1956 | Allen | 159—16 |
| 2,777,514 | 1/1957 | Eckstrom | 159—13 X |
| 3,094,571 | 6/1963 | Wilson et al. | 202—160 X |
| 3,183,145 | 5/1965 | Collins. | |

NOMAN YUDKOFF, *Primary Examiner.*

J. SOFER, *Assistant Examiner.*